United States Patent [19]
Onuki et al.

[11] Patent Number: 4,876,158
[45] Date of Patent: Oct. 24, 1989

[54] PISTON RING HAVING A WEAR RESISTANT SURFACE LAYER

[75] Inventors: Toru Onuki; Junichi Sagawa; Tamotsu Watanabe, all of Kashiwazaki; Toshio Yoshimitsu, Oyama, all of Japan

[73] Assignees: Kabushikikaisha Riken; Kabushiki Kaisha Komatsu Seisakusho, both of Tokyo, Japan

[21] Appl. No.: 169,706

[22] Filed: Mar. 18, 1988

[30] Foreign Application Priority Data

Mar. 20, 1987 [JP] Japan .................................. 62-66795

[51] Int. Cl.$^4$ ............................................... B22F 5/02
[52] U.S. Cl. .................................... 428/565; 428/564; 428/614; 428/632; 277/235 A

[58] Field of Search ............... 428/614, 621, 632, 552, 428/553, 558, 564, 565; 277/235 R, 235 A, DIG. 6

[56] References Cited

U.S. PATENT DOCUMENTS 4,681,817  7/1987  Shinada ........................... 277/235 A

FOREIGN PATENT DOCUMENTS

184604  6/1986  European Pat. Off. .

Primary Examiner—Melvyn J. Andrews
Assistant Examiner—George Wyszomierski
Attorney, Agent, or Firm—Armstrong, Nikaido, Marmelstein, Kubovcik & Murray

[57] ABSTRACT

There is disclosed a wear resistant surface layer composed of 40 to 70 wt. % cobalt or cobalt base alloy as binder and the balance is substantially chromium oxide particles.

2 Claims, 6 Drawing Sheets

PISTON RING HAVING A WEAR RESISTANT SURFACE LAYER

BACKGROUND OF THE INVENTION

1. Field of the Invention

This invention relates to a wear resistant surface layer.

2. Description of the Prior Art

In recent years, for higher power generation, the internal combustion engine has been improved for larger compression ratio and higher rate of revolution. However, this leads to exposure of the piston ring, cylinder liner, and other sliding parts to higher working temperatures and formation of thinner lubricant oil film on these parts. As a result, these parts are rubbed more with metal surfaces, getting leading to excessive wear and even scuffing in worst cases. Accordingly, these sliding parts have come to require more wear and scuffing resistance than before.

To endow these sliding parts with the required wear resistance, it has been known to plate the parts with hard chromium. The hard chromium plating thus formed is superior in hardness and has such a desirable wear resistance that both the plating itself and the part surface that is brought in contact thereto wear less. Incapable of retaining oil on its surface, however, the above plating scuffs readily as the plated surface is rubbed.

As a surface layer with improved scuffing resistance, therefore, the spray fused deposit molybdenum surface layer has come to replace the hard chromium layer in some cases in recent years. The surface layer formed by spray fused depositing molybdenum, which is porous enough to satisfactorily retain oil in the surface thereof and has a high melting point, is superbly resistant to scuffing. Being less hard than the hard chromium plating, however, the spray fused deposit molybdenum surface layer is less wear resistant than such plating. Another weak point of the above molybdenum surface layer is susceptibility to oxidation at high temperatures, which means a shorter service life.

To overcome the above weak point of the spray fused deposit molybdenum surface layer, a mixed powder of ferrochrome, molybdenum and nickel-chromium alloy is plasma spray fused deposited to form a surface layer in some cases. Containing molybdenum, however, this type of spray fused deposit surface layer is also susceptible to oxidation at high temperatures, posing a problem of short service life.

On the one hand, types of spray fused deposit surface layers formed by plasma spray fused depositing oxide ceramics, such as titania ($TiO_2$), alumina-titania ($Al_2O_3$ containing 13 or 40 wt. % $TiO_2$), chromium oxide ($Cr_2O_3$), and zironium-yttria ($ZrO_2$ containing 8 to 12 wt. % of $Y_2O_3$), were also tested, which showed weaker binding forces and thereby unsatisfactory adhesion to the underlying surface and susceptibility to chipping.

OBJECTS AND SUMMARY OF THE INVENTION

Accordingly it is an object of the present invention to provide a wear resistant surface layer that adheres satisfactorily to the base material, being highly resistant to wear and scuffing even when rubbed under hard conditions.

Among other ceramics, chromium oxide is particularly suitable in improving the wear and scuffing resistance. A surface layer made just by spray fused deposition of chrome oxide has however a problem of poor adhesion and susceptibility to chipping as already mentioned. After strenuous studies, the present inventors succeeded in developing a surface layer of superior resistance to wear, scuffing and chipping that is composed of chromium oxide granules and a given amount of cobalt or cobalt base alloy as binder.

Namely, the invention relates to a wear resistant surface layer composed of 40 to 70 wt. % cobalt or cobalt base alloy as binder and the rest that is practically chromium oxide granules.

Cobalt or cobalt base alloy forms a network structure in the layer, with chromium oxide granules embedded therein, to increase the binding forces between granules and thereby contribute to the high chipping resistance of the layer. Among other metals, cobalt has a satisfactory wear resistance, so addition of cobalt results in no remarkable deterioration of the layer in wear resistance. Instead of cobalt, a cobalt base alloy, such as Stellite TM or one of self-fluxing cobalt alloys as defined in Japanese Industrial Standard JIS H8303 "Spray Fused Deposits of Self-Fluxing Alloys" may be used as binder. Use of nickel as binder is possible but not preferable since the wear resistance is thereby affected adversely. If the cobalt or cobalt base alloy content of the surface layer is lower than 40 wt. % (hereinafter "wt. %" will be abreviated to "%"), the binding forces as mentioned above will not be high enough to improve the chipping resistance substantially, while if such content exceeds 70%, the amount of chromium oxide powder as compared to the binder is too low to get satisfactory wear and scuffing resistance.

DESCRIPTION OF THE PREFERRED EMBODIMENTS

First, there will be explained a suitable method to form a wear resistant surface layer according to the invention.

The surface layer of the invention is formed by plasma spray fused deposition of chromium oxide particles which have particle sizes between 1 and 74 μm and are coated with a layer of fine powder of cobalt or cobalt base alloy using a resinous material or the like as binder. Alternatively, chromium oxide granules and powdery cobalt or cobalt base alloy may be mixed on a granulator to make coated granules for plasma spray fused deposition. It formed to granule sizes smaller than 5 μm by the above granulation process, these coated granules are difficult to put into the plasma jet flow, while granule sizes larger than 105 μm sometimes lead to unsatisfactory fusion during plasma spray fused deposition. Thus, the preferable granule size for the granulation process is from 5 to 105 μm. The above cobalt or cobalt base alloy provides a network structure in the spray fused deposit surface layer to increase the binding forces of the layer material. If a simple mixture of chromium oxide granules and cobalt or cobalt base powder is used without such granulation as mentioned above, differences in the particle size and in the specific gravity between these two powdery materials make it difficult to achieve any uniform formation of spray fused deposit surface layer. The network structure of cobalt then fails to extend in the whole layer, only exerting unsatisfactory binding forces.

Figure 2:
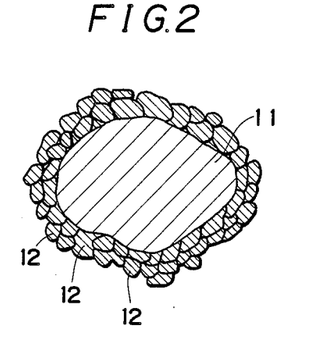
FIGS. 2 and 3 are each a schematic illustration of the structure of a single granule in cross section of a granular material used for spray fused deposition.
Figure 3:
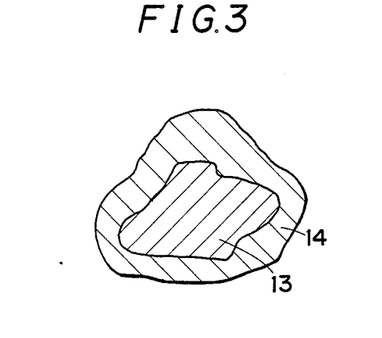

To coat chromium oxide particles with cobalt or cobalt base alloy, for example, it is possible to mix chromium oxide powder and powdery cobalt or cobalt base alloy in water or an organic solvent, such as alcohol, with phenol resin or polyvinyl alcohol added as binder, on a granulator, or alternatively to deposit cobalt or cobalt base alloy by the chemical vapor deposition (CVD). Both methods are applicable to the present invention. FIG. 2 schematically illustrates the structure of a single coated granule of granular material prepared by the above granulation process in an expanded sectional view, wherein a chromium oxide particle 11 is coated with fine powdery cobalt or cobalt base alloy 12. FIG. 3 schematically illustrates the structure of a single coated granule formed by the above CVD process in an expanded sectional view, wherein a chromium oxide particle 13 is coated with a surface cobalt layer 14 to provide a coated granule of granular material for spray fused deposition.

The invention will be more clearly understood with reference to the following examples.

EXAMPLES

From a square rod made of cast iron, a number of rectangular parallelpiped pieces, each sized 5 mm×5 mm×10 mm, were cut. The regular square end face of each of these pieces was plasma sprayed with a material as listed in Table 1 to form a 3 mm thick spray fused deposit surface layer to provide test specimens. After finishing the surface of such layer to a surface roughness of 0.8 to 1.5 μm (Rz) by polishing, the specimens were subjected to a scuffing resistance test and a wear resistance test. For the above spray fused deposition, the following conditions were used:
Gun: Meteco Model 3 MB;
Current: 450 to 500 A; Voltage 61 V; and
Gas: Mixed gas of argon and hydrogen
(110 ft³ Ar/hr and 10 ft³ H/hr).

It is noted that for the test specimens A through I, the 80% nickel and 20% chromium alloy was deposited 0.1 mm thick by spray fusion to form an undercoating layer and the spray fused deposit surface layer was formed thereon and that the test specimens K and L were made by flame spray fused deposition and plating, respectively.

TABLE 1

| Specimen | Coated granules Composition | Granule size (μm) | Remark |
|---|---|---|---|
| A | Cr₂O₃ only | 5-74 | Cont. (Comparative Example) |
| B | 30% Co, Cr₂O₃ for rest | 10-105 | Cont.; granulation |
| C | 38% Co, Cr₂O₃ for rest | 10-105 | Cont.; CVD |
| D | 40% Co, Cr₂O₃ for rest | 10-105 | Example; granulation |
| E | 50% Co, Cr₂O₃ for rest | 10-105 | Example; CVD |
| F | 60% Co, Cr₂O₃ for rest | 10-105 | Example; granulation |
| G | 70% Co, Cr₂O₃ for rest | 10-105 | Example; CVD |
| H | 72% Co, Cr₂O₃ for rest | 10-105 | Cont.; granulation |
| I | 80% Co, Cr₂O₃ for rest | 10-105 | Cont.; CVD |
| J | 70% Fe—Cr, 23% Mo, 7% Ni—Cr | 10-105 | Cont.; mixed powder used |
| K | Molybdenum wire | — | Cont. |
| L | Hard chromium plating | — | Cont. |

Figure 1:
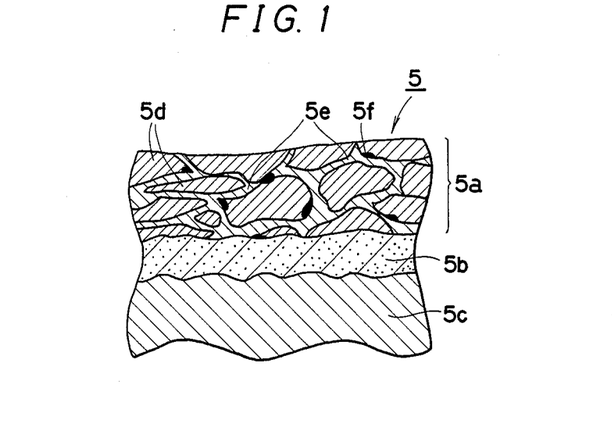
FIG. 1 is a sketch of the microscopic structure in cross section of a wear resistant surface layer embodying the invention.

For example, the wear resistant surface layer formed according to the invention on the test specimen E presented a microscopic structure (400 magnifications) as sketched in FIG. 1. The test specimen 5 was composed of the spray fused deposit surface layer 5a, undercoating nickel-chromium alloy layer 5b formed by spray fused deposition to improve adhesion of such surface layer, and base material cast iron 5c. The spray fused deposit surface layer 5a itself is composed of chromium oxide granules 5d enclosed with a network structure of cobalt 5e, wherein some pores 5f open. X ray analysis and X ray diffraction confirmed no difference in the composition of individual phases of the surface layer and ratio of these phases from the material used for spray fused deposition. Scuffing resistance test.

Figure 4:
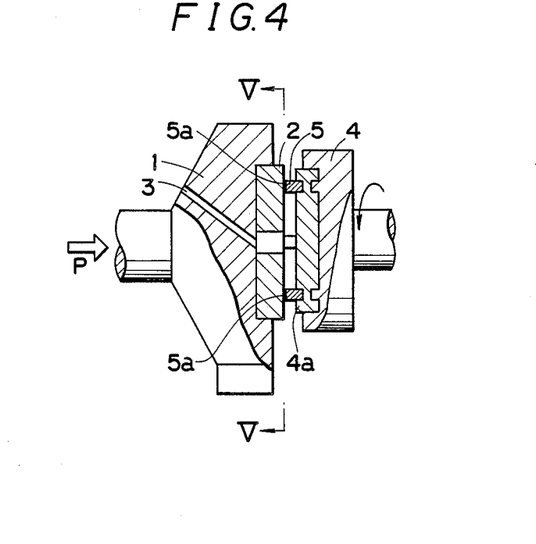
FIG. 4 is a partially sectional view of the major part of a scuffing tester.
Figure 5:
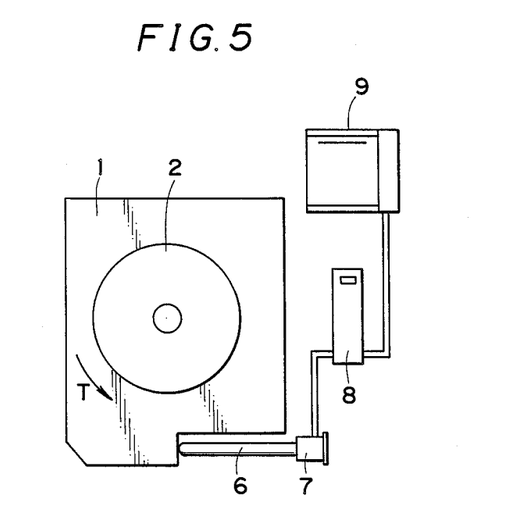
FIG. 5 is a side view of the same part of FIG. 4 after detachment at line V—V and viewed in the direction of arrows at the ends of line V—V.

The tester used is illustrated in FIG. 4 and 5. The latter is a side view of the tester after detachment at line V—V of FIG. 4 and as viewed in the direction of arrows on line V—V. A disk 2 with a diameter of 80 mm and thickness of 10 mm, which was surface finished by polishing, was detachably mounted on a stator holder 1. At the center of disk 2, a lubrication hole 3 was open, through which lubricant was fed from the back side. The stator holder 1 was pushed by a specified pressure p exerted in the right direction in FIG. 4 by a hydraulic system not shown. A rotor 4 was disposed opposite to the disk 2, which was driven at a given revolving rate by a driving system not shown. The end face of rotor 4 facing the disk 2 was fitted with a test specimen holder 4a, which was designed to hold four pieces of test specimen 5 disposed at equivalent intervals of space along a concentric circle with the regular square end face (the surface layer 5a in the figure) thereof slidably butted to the surface of disk 2.

In the above test set-up, a specified pressure P was applied to the stator 1 to bring the surface layer 5a of test specimen 5 in contact with disk 2 (mating piece) with a certain pressure and while lubricant was fed through the lubrication hole 3 to the sliding surfaces at a given feed rate, the rotor 4 was driven. At certain intervals of time, the pressure applied to the stator 1 was incremented and the torque T that was generated on the stator 1 as the test specimen 5 turned with the rotor 4 for friction with the disk 2, namely, the torque generated by friction was conveyed through a spindle 6 to the load cell 7, whose output was applied to a dynamic strain meter to determine the torque for recording on a recorder 9. A sharp increase in the torque T was assumed to indicate scuffing The value of torque T at which the seizure was indicated was used to estimate the scuffing resistant performance.

The test was conducted under the following conditions:

Sliding velocity: 8 m/sec;
Lubrication: Motor oil SAE30 fed 400 ml/min;
Contact pressure: 20 kg/cm$^2$ at start, incremented 10 kg/cm$^2$ at every 3 min; and
Mating disc: Spray fused deposit chromium oxide surface layer (the same type of layer as the test specimen A) surface finished by polishing as the test specimens.

Figure 6:
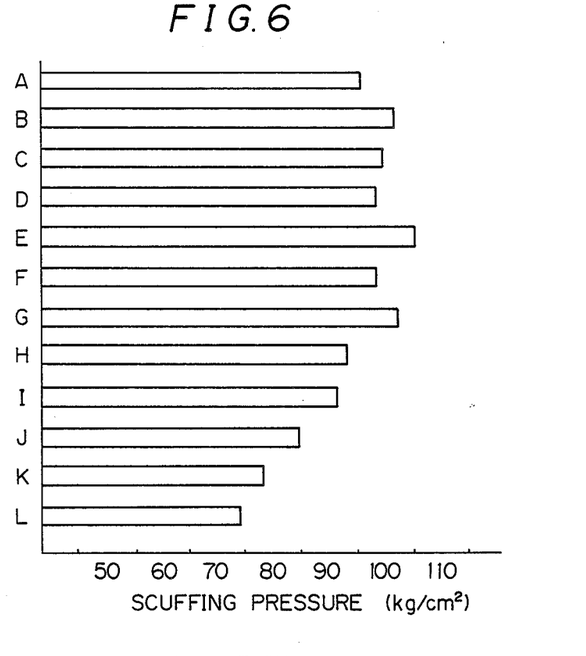
FIG. 6 shows the results of a scuffing test presented in a bar graph.

FIG. 6 is the results of test, from which the following findings were made.

The test specimen A to which only chromium oxide was applied by spray fused deposition gave a superior scuffing resistance. The specimens B through G to which chromium oxide coated with binder cobalt was applied did not differ substantially from the specimen A in the scuffing performance. As the cobalt content of spray fused deposited material was over 70% (specimens H and I), however, the scuffing resistance declined sharply.

The specimens B through G whose surface layer contained 30% to 70% cobalt were naturally outperformed in the scuffing test the hard chromium plated specimen L and even the specimen K with a flame spray fused deposit molybdenum surface layer, which was supposed to be highly resistant to scuffing.

After the above test, the specimen A was found to have a turtleback-like cracking pattern in the surface but no such cracking pattern was detected from other test specimens.

WEAR RESISTANCE TEST

The tester shown in FIGS. 4 and 5 was also used for a wear resistance test under the same test conditions as applied to the scuffing test except for the specimen's sliding velocity of 5 m/sec and constant contact pressure of 50 kg/cm$^2$. The test was continued until the sliding distance reached 100 km.

For the wear of surface layer, the specimens were detached from the tester after testing and the decrease in the height thereof was determined while for the wear of disk, the radial cross sectional area of the annular furrow made in the disc surface was determined.

Figure 7:
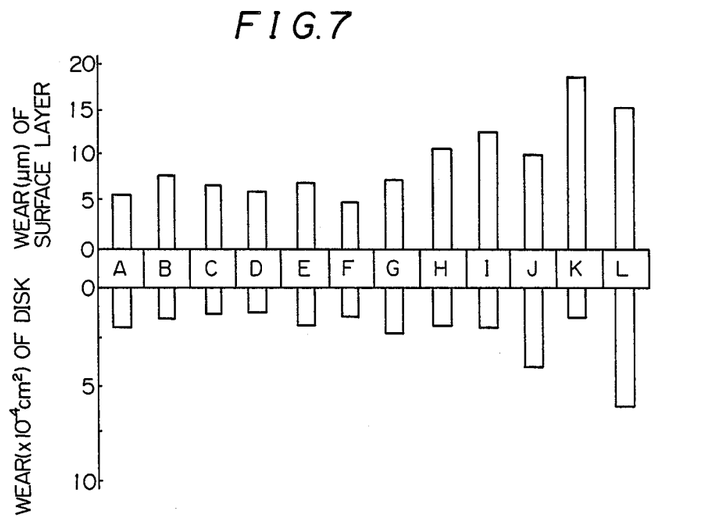
FIG. 7 shows the results of a wear resistance test presented in a bar graph.

FIG. 7 is the test results, from which the following findings were made.

The test specimens A through G together with the mating disk were found to wear less as compared to the hard chromium plated test specimen L supposed to be superior in wear resistance. Thus, these specimens presented superior wear resistance. It is noted that the specimens B through G did not differ substantially in spite of different cobalt contents of the individual materials used for spray fused deposition. With the cobalt content higher than 70 (specimens H and I), however, the wear of specimen's surface layer increased sharply. The test specimen K's flame-spray fused deposit molybdenum surface layer worn much though without any substantial wear of the mating disc.

CHIPPING RESISTANCE TEST

Figure 8:
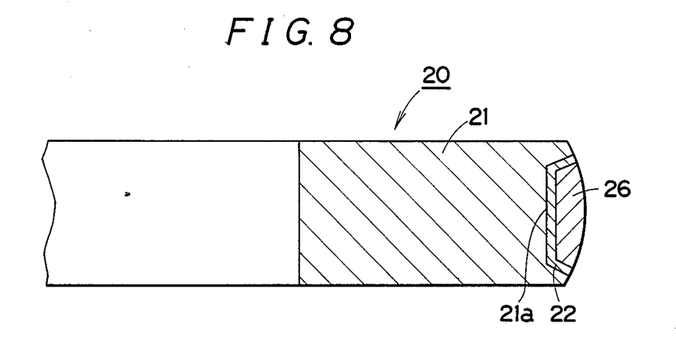
FIG. 8 is an expanded sectional view of part of a piston ring.

A number of piston rings made of speroidal graphite cast iron were acquired and a groove 21a was cut in the outer round face of each piston ring 21 as shown in FIG. 8. For piston ring test specimens A to I, 80% nickel-20% chromium alloy was deposited in the groove 21a by spray fused deposition to form a 0.1 mm thick undercoating layer 22. Further, a surface layer 26 was deposited 0.2 mm thick by spray fused deposition. After polishing, a barrel faced piston ring 20 of nominal ring diameter of 120 mm, ring width of 2.5 mm, radial wall thickness of 4.1 mm and total free gap of 16 mm was thus made for each specimen. For piston ring test specimens J and K, the spray fused deposit surface layer was directly formed in the groove 21a without formation of the above undercoating layer 22. Further, the piston ring test specimen L was made by hard chrome plating the outer round face of a barrel faced piston ring made of nodular graphite cast iron followed by polishing the plated outer round face.

It is noted that in all of the above scuffing resistance test, wear resistance test and chipping resistance test, the same alphabetical letters were used to identify individual types of surface layer.

Figure 9:
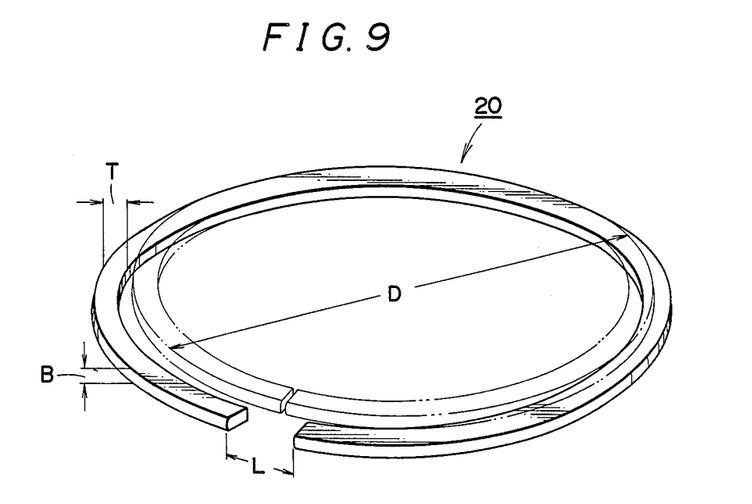
FIG. 9 is a perspective view of the piston ring of FIG. 8.

FIG. 9 is a perspective view of piston ring 20 that was twisted to test the chipping resistance of the surface layer.

Figure 10:
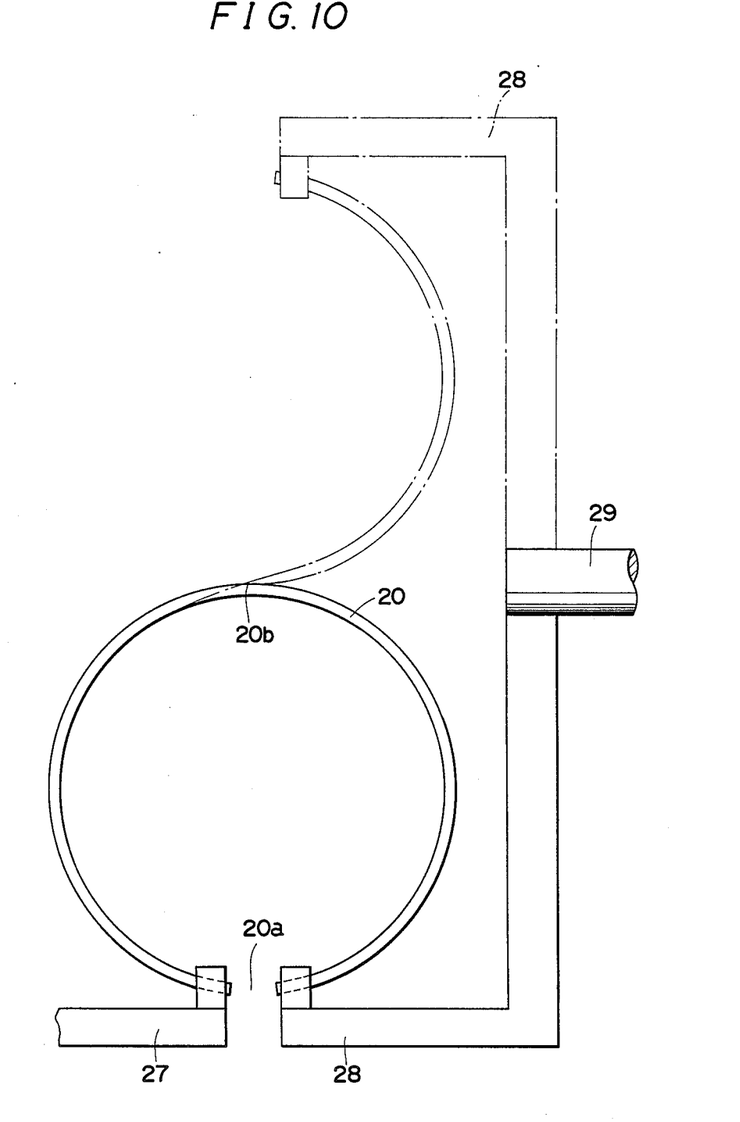
FIG. 10 is a plan view of the major part of a chipping resistance tester.

Namely, as in FIG. 10, the end faces of a free piston ring 20 opposing each other at the gap 20a were secured to holders 27 and 28 and while locking the holder 27 immovable the shaft 29 of holder 28 were turned to twist the ring 20 as indicated by interrupted lines with the point 20b on the ring that was opposed across the ring center to the gap 20a as the center of twisting. While twisting the ring 20, the outer round face thereof was examined by observation and the twist angle at which the surface layer started chipping was determined as an estimate of the chipping resistance of surface layer.

Figure 11:
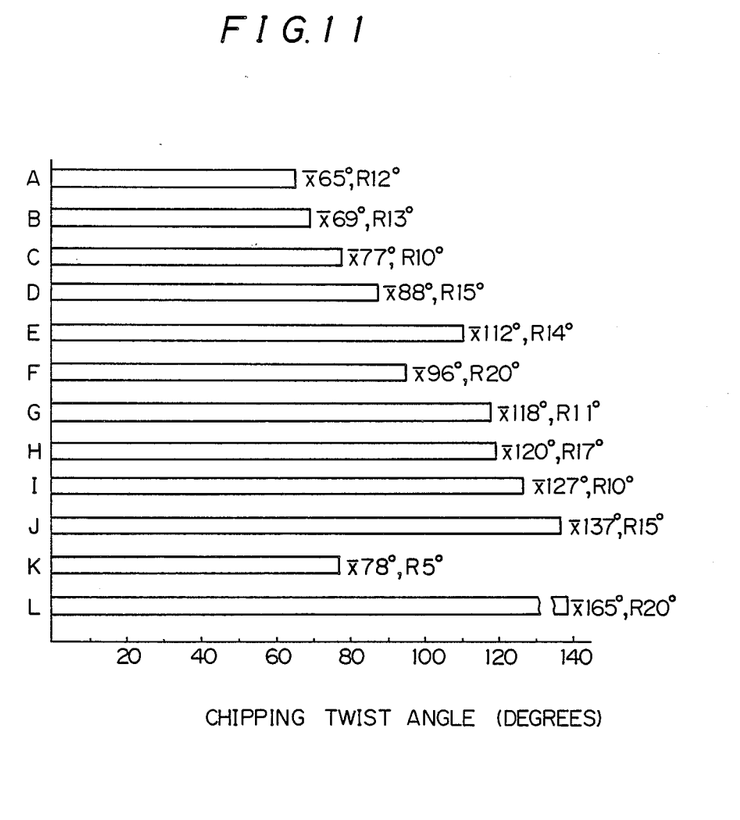
FIG. 11 is results of a chipping resistance test presented in a bar graph.

FIG. 11 is the results. It is noted that for each type of piston ring test specimen five samples were tested, so these results are given as the mean value $\bar{x}$ and range of variation R. The following findings were made from FIG. 11.

The piston ring A to which only chromium oxide was used to form the spray fused deposit surface layer presented a remarkably low chipping resistance. With cobalt added to the above spray fused deposit surface layer, the chipping resistance of the layer improved as the cobalt content increased (B to I). With the cobalt content higher than 40% (D to I), the improvement was remarkable. By contrast, the flame spray fused deposit molybdenum surface layer (specimen K) was found to perform unsatisfactorily in the chipping resistance test.

In all of the above scuffing resistance test, wear resistance test and chipping resistance test, use of Stellite TM (2.5-2.6% C, 45-46% Co, 25-30% Cr, 15-20% W and 0.5% Fe) or self-fluxing cobalt alloys (MSFCo1 or MSFCo2 as defined in JISH 8303) instead of cobalt have almost similar results.

It is concluded from the above tests that a wear resistant surface layer that performs satisfactorily in all of the scuffing resistance, wear resistance and chipping resistance is one composed of chromium oxide containing 40 to 70% cobalt or cobalt base alloy.

It will be evident that various modification can be made to the described embodiments without departing from the scope of the present invention.

What is claimed is:

1. A piston ring having a wear resistant surface layer consisting essentially of 40 to 70 wt. % cobalt or cobalt base alloy as a binder, and the balance being substantially a powder of dichromium trioxide ($Cr_2O_3$).

2. A piston ring as claimed in claim 1 wherein an undercoating layer of nickel-chromium alloy is located between a base material and the wear resistant surface layer.

* * * * *